June 26, 1934.   M. HAAS   1,964,351
INDEXING MECHANISM
Filed June 25, 1931   2 Sheets-Sheet 1
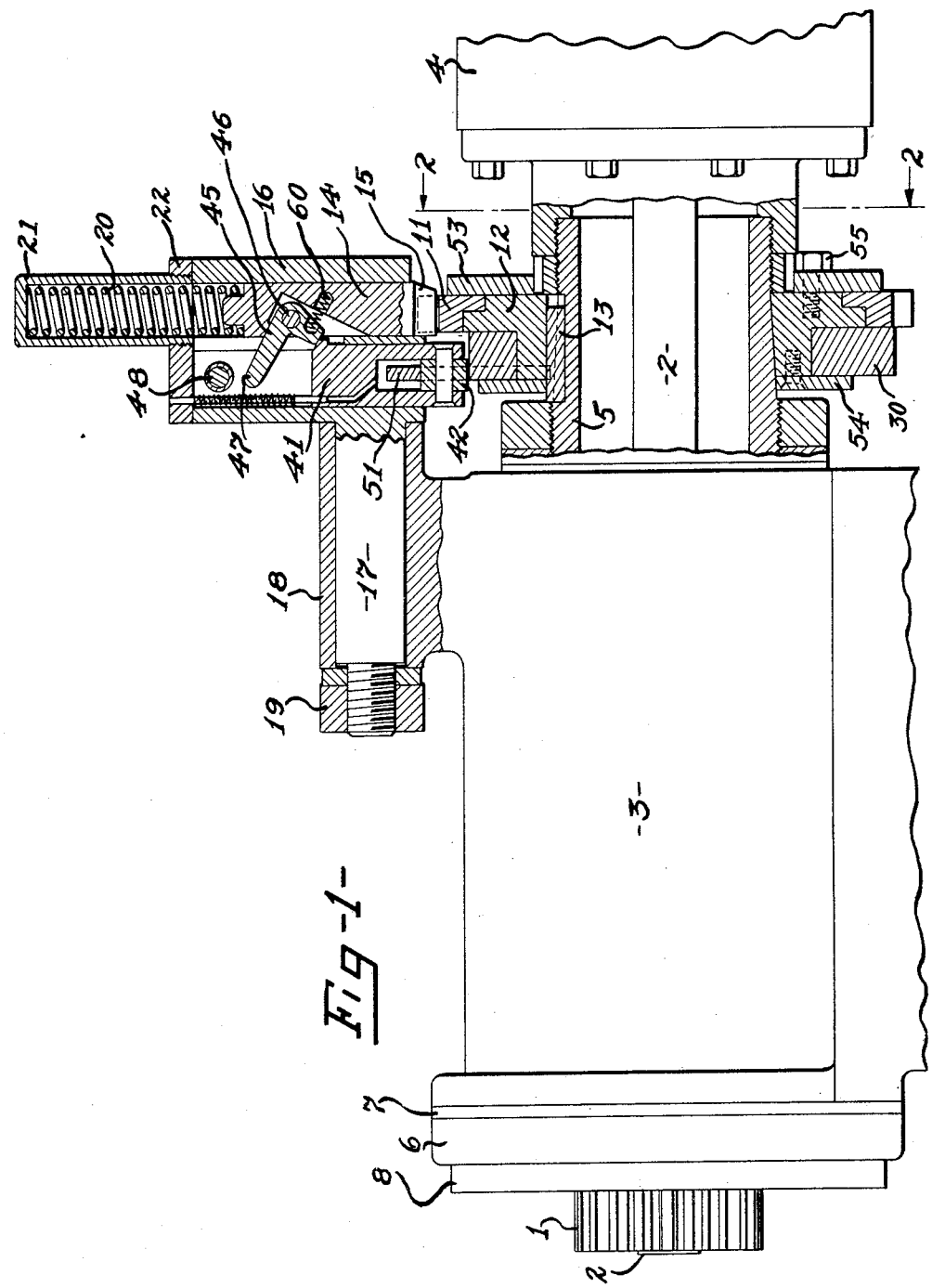
Fig-1-
INVENTOR
Max Haas
BY Bodell & Thompson
ATTORNEYS.

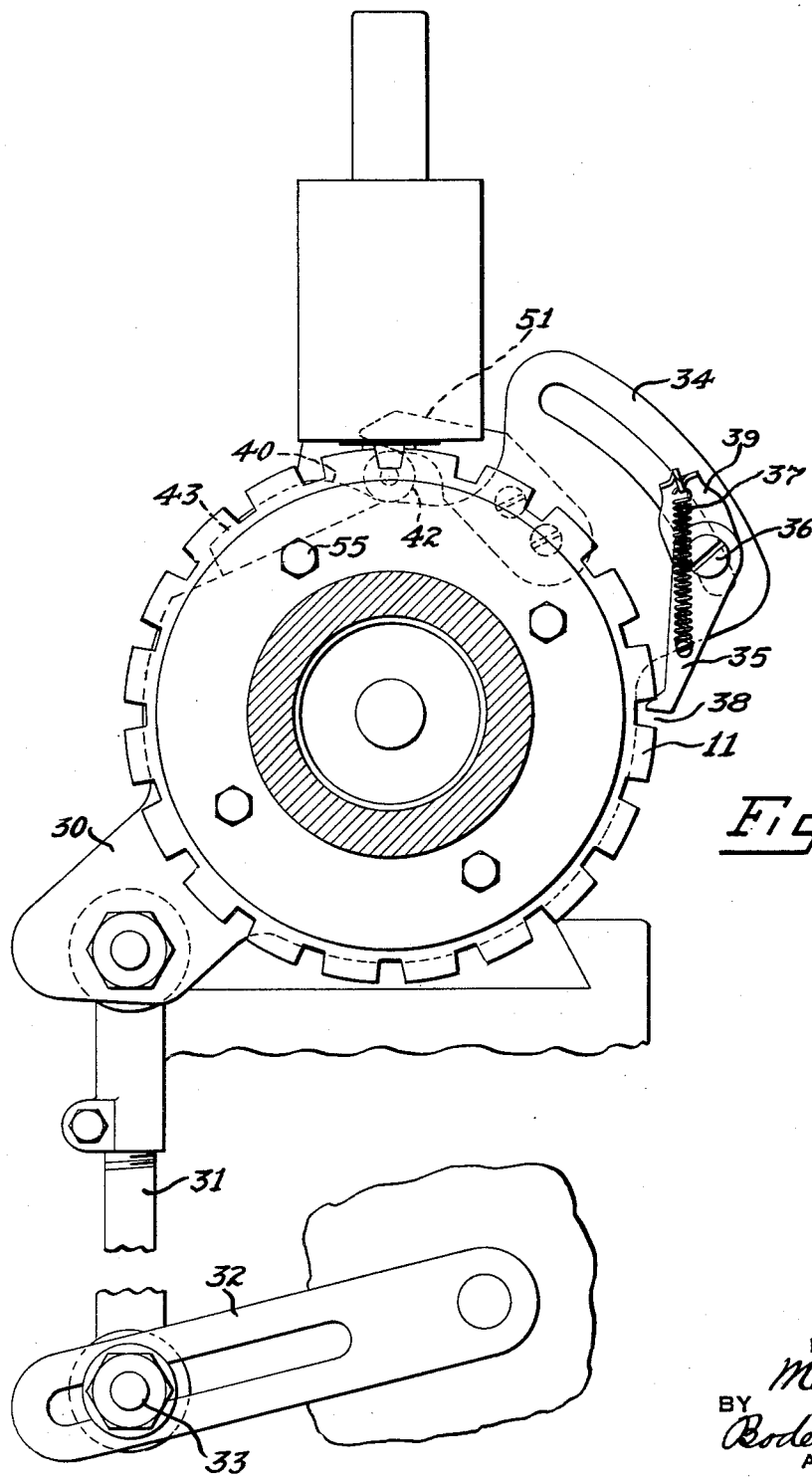

Patented June 26, 1934

1,964,351

UNITED STATES PATENT OFFICE 1,964,351

INDEXING MECHANISM

Max Haas, Syracuse, N. Y., assignor to W. C. Lipe, Inc., New York, N. Y., a corporation of New York Application June 25, 1931, Serial No. 546,799

6 Claims. (Cl. 90—56)

This invention has for its object an indexing mechanism and has for its object an indexing mechanism by which the toothed index member or detent which coacts with the index wheel is returned into engagement with the index wheel after the indexing operation with a snap action so that the machine to which the index mechanism is attached may be speeded up without providing means for increasing the speed of operating the index mechanism or the detent thereto and also by which the detent is quickly moved out of engagement with the index wheel preliminary to the indexing operation.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of this index mechanism, the contiguous portion of the machine with which the index mechanism is used, being also shown.

Figure 2 is a sectional view on line 2—2, Figure 1, additional portions of the machine being shown.

This index mechanism comprises generally a toothed index wheel, a detent having a tooth coacting with said wheel, mechanism operated by the machine to which the index is applied, for actuating the wheel step by step and timing the actuation thereof, means operated by the actuating means for withdrawing the detent preliminary to the actuation of the wheel and means for giving a snap action to the detent for thrusting the tooth thereof into engagement with the wheel at the end of each indexing operation.

I have here shown this index as applied to a machine for indexing gears which are being operated upon as by having the ends of their teeth pointed for the purpose of facilitating the engagement and disengagement of gears when embodied in a slide gear transmission, although the character of the work to be indexed does not enter into the invention.

1 designates the gear being operated upon, this being held in any suitable manner on an arbor 2. 3 designates the portion of the frame of the machine in which the arbor is mounted and in which suitable chuck mechanism is also mounted for holding the work on the arbor.

4 designates an air cylinder by means of which the chuck within the frame 3 of the machine is operated. 5 is a rotatable tubular shaft concentric with the arbor 2 and suitably journalled in the frame 3, it having a discoidal head 6 at its outer end thrusting against a washer 7 at the end of the frame. 8 is a face plate between the gear and the head 6. The cylinder 4 is mounted on and rotatable with the shaft 5. The construction thus far described forms no part of this invention.

11 designates a toothed index wheel detachably mounted on a hub 12 secured to the tubular shaft 5 to rotate therewith as by a key 13, the index wheel having a number of teeth corresponding to the number of teeth of the work being operated on, and being interchangeable with other index wheels having a different number of teeth when pieces of work as gears having a different number of teeth are to be operated upon.

14 designates a detent having a tooth 15 coacting with the teeth of the index wheel 11, the detent being here shown as arranged radially relative to the index wheel 11 and as slidable in a suitable guide 16 mounted upon the frame 3, it being here shown as having a laterally extending bracket or stem 17, which may be clamped to a bearing 18 on the frame 3 in any suitable manner as by a nut 19 threading on a reduced threaded end of the stem 17. The detent is spring pressed into engagement with the index wheel by means of a spring 20 thrusting at one end against the outer end of the detent 14 and at its other end against the top of a spring barrel or housing 21 threading into the top plate 22 of the guide 16.

The means for actuating the index wheel when it is released from the detent is here shown as an oscillating member 30 mounted to rock about the tubular member 5, it being shown as mounted on a reduced portion of the hub 12 and having outwardly extending arms on opposite sides of the axis of the index wheel 11. One of these arms is connected as by a link 31 to an oscillating actuator 32 actuated in any suitable manner from any moving part of the machine, the link 31 being adjustably connected to one of the arms which it connects, as by a pin-and-slot connection, it being here shown as adjustably connected at 33 to the actuator arm 32. The other arm 34 carries a pawl 35 coacting with the index wheel or some part movable therewith and is here shown as coacting directly with the teeth of the index wheel. The pawl 35 is adjustably carried by the arm 34 and the arm 34 is provided with a slot for adjustably receiving the pivot screw 36. The pawl is pressed by a spring 37 against the teeth of the index wheel 11. The pawl is adjustable for various numbers of teeth in the index wheel. The spring 37 is secured at one end to the pawl and at its other end to an arm 39 for convenience mounted on the pivot screw. The screw is a screw bolt and extends through the slot in the arm 34 and is suitably formed to hold the arm 39 from turning but permits pivotal movement of the pawl. Any well known form of clamping device or pivot screw may be used. There is a lost motion at 38 between the pawl and the next tooth of the index wheel, which lost motion permits a preliminary movement of the pawl relative to the index wheel while the detent is being withdrawn from the index wheel.

The means operated by the actuating means or oscillating member 30 for withdrawing the detent 14 from the index wheel preliminary to the indexing operation is here shown as a cam surface 40 on the oscillating member, a follower 41 coacting with the cam surface and movable adjacent to or along one side of the detent 14, and means for detachably coupling the follower and the detent. The follower 41 has a roller 42 coacting with the cam. The cam surface 40 is usually provided on a block 43 which is either of harder metal than the member 30 or is wider than the follower. The block 43 is secured in any suitable manner to the oscillating member 30. The follower 41 is coupled to the detent member 14 by a releasable part for convenience called a trigger, which trigger couples the follower 41 and the detent at the end of the withdrawing action or after the indexing operation to permit the spring 20 of the detent to react and move the detent 14 into engagement with the index wheel with a snap action.

45 designates the trigger which is here shown as an angle lever carried by the detent 14 and pivoted at 46, in a recess in one side of the detent, one arm of the trigger engaging the follower 41 and the other arm 47 being arranged to engage a trip or knock off shoulder 48 located in the path of the arm 47 and to engage said arm at the end of the withdrawing action of the detent 14. The oscillating member 30 is also provided with an overhanging portion 51 for engaging the roller 42 and returning the follower 41 to its normal position during retrograde movement of the cam. The withdrawing movement of the follower 41 is sufficient to permit continued withdrawal after the detent tooth clears the index wheel 11 in order that the wheel will have time to index before the trigger 45 is tripped. The operation is timed so that the trigger is tripped instantly at the end of the index movement of the index wheel.

The index wheel 11 is detachably secured to the hub 12 by plate 53 which is secured in position in any suitable manner as by screws 55. A plate 54 also holds the oscillating member from displacement.

In order to insure a positive return of the follower 41 to its starting position, the overhanging cam 51 is provided for hooking over the roller 42 and pushing the follower 41 back to its normal position. When it reaches its normal position the trigger is reset by means of the spring 60.

In operation, the link 31 and the pawl 35 are adjusted to the proper position for the index wheel 11 and during the operation, the actuator arm 32 and the oscillating member 30 are rocked in synchronism with the gear machine to which the index mechanism is applied. During the upward movement of the arm 32 and link 31, the oscillating member 30 is rocked, rocking the pawl 35 therewith, and during the preliminary rocking, the lost motion at 38 between the pawl 35 and the next tooth of the index wheel is taken up and while it is being taken up, the lift portion 40 of the cam thrusts against the roller 42 and pushes the follower 41 upwardly carrying through the trigger 45 the detent 14, the withdrawing movement of the detent 14 being against the action of the spring 20. During further upward movement of the arm 32, the pawl 35 turns the index wheel and hence the shaft 5 and gear 1 one step and then the arm 47 of the trigger engages the knock off shoulder or pin 48 releasing the trigger from the follower 41 permitting the spring 20 to react and thrust the detent 14 into engagement with the next tooth of the index wheel. During the downward movement of the arm 32, the pawl 35 ratchets over the teeth of the index wheel and the actuator and cam return to their normal or starting position.

This indexing mechanism is particularly advantageous in that it is compact and economical in construction and also especially rapid and accurate in operation and permits a rapid operation of the machine to which it is applied.

What I claim is:

1. In an index wheel mechanism, the combination of a toothed index wheel, a spring pressed detent coacting with said wheel, means for actuating the wheel step by step, means operated by the actuating means for withdrawing the detent preliminary to and holding the same withdrawn during the actuation of the wheel, said means including a cam movable about the axis of the index wheel and a follower coacting with the cam, means including a trigger coupling the detent and the follower during the withdrawing operation, the trigger being spring pressed and carried by the detent and a knock off device arranged in the path of the trigger to engage the same as the detent approaches the end of its withdrawing movement.

2. In an index wheel mechanism, the combination of a toothed index wheel, a spring pressed detent coacting with said wheel, means for actuating the wheel step by step, means operated by the actuating means for withdrawing the detent preliminary to and holding the same withdrawn during the actuation of the wheel, means including a trigger coupling the detent and the withdrawing means during the withdrawing operation, the trigger being spring pressed and carried by the detent, a knock off device arranged in the path of the trigger to engage the same as the detent approaches the end of its withdrawing movement, and means for actuating the withdrawing means.

3. In an index wheel mechanism, the combination of a toothed index wheel, a spring pressed detent coacting with said wheel, means for actuating the wheel step by step, means operated by the actuating means for withdrawing the detent preliminary to and holding the same withdrawn during the actuation of the wheel, means including a trigger coupling the detent and the withdrawing means during the withdrawing operation, the trigger being spring pressed and carried by the detent and a knock off device arranged in the path of the trigger to engage the same as the detent approaches the end of its withdrawing movement, means operated by the actuating means for returning the withdrawing means.

4. In an indexing mechanism, the combination of a toothed index wheel, a spring pressed detent coacting with said wheel, oscillating means for actuating the wheel step by step, a lost motion, a motion transmitting device between the oscillating means and the wheel whereby the oscillating means has a preliminary movement relatively to the wheel, means operated by the actuating means during said preliminary movement for withdrawing the detent, a coupling connecting the withdrawing means and the detent including a spring-pressed trigger, means for tripping the trigger at the end of the withdrawing movement, and means operated during the retrograde movement of the withdrawing means for positively returning the withdrawing means to its normal position.

5. In an indexing mechanism, the combination of a toothed index wheel, a detent coacting with said wheel, an oscillating actuating member having a pawl coacting with the wheel to transmit a feeding movement thereto, there being a lost motion between the pawl and the wheel whereby the pawl has a preliminary movement relative to the wheel, cam means operable by the actuating means, a follower coacting with the cam means, a coupling between the follower and the detent normally coupling them together including a releasable part, means for tripping said part at the end of the withdrawing movement of the detent, cam means operated by the actuating member and coacting with the follower to return it to its normal position, and a spring acting on the releasable part for automatically resetting the releasable part when the follower is returned to its normal position.

6. In an indexing mechanism, the combination of a toothed index wheel, a spring pressed detent coacting with said wheel, means for actuating the wheel step by step, means operated by the actuating means for withdrawing the detent preliminary to the actuation of the wheel, and for holding the detent withdrawn, the actuating means including a pawl coacting with the toothed wheel, a carrier for the pawl movable back and forth, the pawl having a tooth for coacting with the teeth of the toothed wheel, and of less width than the spaces between the teeth, and normally arranged at the rear side of said space with respect to the direction of feeding movement of the index wheel, whereby there is a lost motion between the tooth and the front wheel of said space, said means for withdrawing the detent being movable with the carrier and operating to withdraw the detent during the movement of the carrier and pawl in the direction of rotation of the index wheel while the pawl is taking up said lost motion, and means for releasing the detent holding means as the index wheel approaches the end of its feeding movement.

MAX HAAS.